United States Patent
Rottmann et al.

(10) Patent No.: US 6,776,004 B2
(45) Date of Patent: Aug. 17, 2004

(54) AIR FRACTIONATION PROCESS AND INSTALLATION WITH MIXING COLUMN AND KRYPTON-XENON RECOVERY

(75) Inventors: Dietrich Rottmann, Munich (DE); Christian Kunz, Munich (DE)

(73) Assignee: Linde AG, Wiesbaden (DE)

( * ) Notice: Subject to any disclaimer, the term of this patent is extended or adjusted under 35 U.S.C. 154(b) by 0 days.

(21) Appl. No.: 10/601,875

(22) Filed: Jun. 24, 2003

(65) Prior Publication Data

US 2004/0007016 A1 Jan. 15, 2004

(30) Foreign Application Priority Data

Jun. 24, 2002 (DE) .......................... 102 28 111

(51) Int. Cl.[7] .............................................. F25J 3/02
(52) U.S. Cl. ....................................................... 62/646
(58) Field of Search ........................ 62/617, 640, 643, 62/646

(56) References Cited

U.S. PATENT DOCUMENTS

| | | | | |
|---|---|---|---|---|
| 5,207,066 A | * | 5/1993 | Bova et al. | 62/645 |
| 6,301,929 B1 | * | 10/2001 | Lochner | 62/643 |
| 6,418,753 B1 | * | 7/2002 | Voit et al. | 62/643 |
| 6,530,242 B2 | * | 3/2003 | Pompl | 62/643 |
| 6,564,581 B2 | * | 5/2003 | Pompl | 62/646 |

* cited by examiner

Primary Examiner—Denise L. Esquivel
Assistant Examiner—Malik N. Drake
(74) Attorney, Agent, or Firm—Millen, White, Zelano & Branigan, P.C.

(57) ABSTRACT

A process and apparatus for low-temperature fractionation of air in a distillation column system for nitrogen-oxygen separation (5, 6) introduces into first feed air stream (4) into a distillation column system for nitrogen-oxygen separation. An oxygen-rich fraction (22) from the distillation column system for nitrogen-oxygen separation is pressurized (23) in liquid form and is added (25) to a mixing column (26). A heat transfer medium stream is introduced into the lower region of the mixing column (26) and is brought into countercurrent contact with the oxygen-rich fraction (22, 25). Gaseous top product (260) from the upper region of the mixing column (26) is introduced into an additional column (27). A liquid (38, 39, 40, 41) from the lower or middle region of the mixing column is introduced into the distillation column system. A krypton- and xenon-containing oxygen stream (44, 46, 47, 48) from the distillation column system is introduced into a krypton-xenon enriching column (36) from which a krypton- and xenon-enriched fraction (51) is obtained. A krypton- and xenon-depleted top fraction (28) is obtained from the upper region of the additional column (27).

21 Claims, 3 Drawing Sheets

AIR FRACTIONATION PROCESS AND INSTALLATION WITH MIXING COLUMN AND KRYPTON-XENON RECOVERY

The invention relates to a process for the low-temperature (cryogenic) fractionation of air in a distillation column system for nitrogen-oxygen separation, in which
- a first feed air stream is introduced into the distillation column system for nitrogen-oxygen, separation,
- an oxygen-rich fraction from the distillation column system for nitrogen-oxygen separation is pressurized in liquid form and is added to a mixing column,
- a heat transfer medium stream, in particular a second feed air stream, is introduced into the lower region of the mixing column and is brought into countercurrent contact with the oxygen-rich fraction,
- a gaseous top product is obtained in the upper region of the mixing column, and
- a liquid from the lower or middle region of the mixing column is introduced into the distillation column system for nitrogen-oxygen separation.

The distillation column system for nitrogen-oxygen separation of the invention may be designed as a two-column system, for example as a conventional double column system, but may also be designed as a one-column, three-column or multi-column system. In addition to the columns for nitrogen-oxygen separation, it may include further equipment for obtaining other constituents of air, in particular noble gases (for example argon).

The oxygen-rich fraction which is used as feed for the mixing column has an oxygen concentration which is higher than that of air and is, for example, 70 to 99.5 mol %, preferably 90 to 98 mol %. A mixing column is understood as meaning a countercurrent contact column in which a relatively highly volatile gaseous fraction is passed in the opposite direction to a liquid of lower volatility.

The process according to the invention is particularly suitable for obtaining gaseous pressurized impure oxygen. In this context, the term impure oxygen is understood as meaning a mixture with an oxygen content of 99.5 mol % or less, in particular of 70 to 99.5 mol %. The product pressures are, for example, 2.2 to 4.9 bar, preferably 2.5 to 4.5 bar. Of course, if necessary the pressurized product can be compressed further in the gaseous state. In principle, the invention can also be employed at mixing column pressures which are higher than the high-pressure column pressure, for example 4.5 to 16 bar, in particular 5 to 12 bar.

Processes of the type described in the introduction are known from EP 531182 A1, DE 19951521 A1 and EP 1139046 A1. Although it is mentioned in passing in EP 1139046 A1 that a krypton-xenon recovery means may be connected downstream of a mixing column system of this type, in practice this has not hitherto been implemented, since with a system of this nature the methods which have hitherto been customary have been unable to achieve economically viable yields of krypton and xenon.

An object of the invention is therefore to provide a process of the type described in the introduction and a corresponding apparatus which operate particularly economically and in particular have a relatively high krypton and/or xenon yield.

Upon further study of the specification and appended claims, further objects and advantages of this invention will become apparent to those skilled in the art.

These objects are achieved by introducing a krypton- and xenon-containing oxygen stream from the distillation column system for nitrogen-oxygen separation into a krypton-xenon enriching column, a krypton- and xenon-enriched fraction is obtained in the krypton-xenon enriching column, and that the gaseous top product of the mixing column is introduced into an additional column, in the upper region of which a krypton- and xenon-depleted top fraction is obtained.

The krypton-xenon enriching column fulfils the standard function of a krypton and xenon enriching means while, at the same time, rejecting methane. However, this alone is not sufficient to achieve a satisfactory krypton and xenon yield in a mixing column process. This is because a significant proportion of the relatively low-volatility constituents of the air is normally removed from the process together with the top product of the mixing column.

Therefore, in the invention in addition to the krypton-xenon enriching column there is an additional column which retains the krypton and xenon which are still present in the top product of the mixing column. This valuable product is therefore no longer lost with the pressurized oxygen product, but rather, by way of example, can be returned to the mixing column or the distillation column system and, from there, can be introduced into the krypton-xenon enriching column.

The terms "mixing column" and "additional column" are in the present context in each case understood in functional terms to represent corresponding countercurrent mass transfer zones. They may be, but do not have to be, arranged in separate vessels. In particular, it is possible for two or more zones of this type to be located one above the other in a common vessel if they are at similar pressure levels. In the invention, by way of example, the mixing column and the additional column may be produced as a combined column of this type. Alternatively, a horizontal partition may be installed between mixing column and additional column, or mixing column and additional column may be accommodated in completely separate vessels.

It is preferable for a part of the krypton- and xenon-depleted top fraction from the additional column to be obtained as gaseous pressurized oxygen product without krypton and xenon being lost in significant amounts.

Furthermore, it is favourable if a (futher) part of the krypton- and xenon-depleted top fraction from the additional column is condensed in a condenser-evaporator. The condensate which is generated in the condenser-evaporator is substantially free of krypton and xenon and is used as reflux for the additional column and the krypton-xenon enriching column.

The condenser-evaporator can simultaneously serve as a bottom evaporator of the krypton-xenon enriching column. The additional column and krypton-xenon enriching column therefore form the high-pressure and low-pressure parts, respectively, of a double column.

In a preferred configuration of the process according to the invention, the oxygen-rich fraction which is added to the mixing column is removed one to five theoretical plates, preferably two to four theoretical plates, above the bottom of the or one of the columns of the distillation column system for nitrogen-oxygen separation. This fraction generally originates from a corresponding intermediate location of the low-pressure column of a two-column system. The krypton- and xenon-containing oxygen stream for the krypton-xenon enriching column, by contrast, is withdrawn from the bottom of this column.

The invention also relates to an apparatus for the low-temperature fractionation of air comprising a distillation column system for nitrogen-oxygen separation, having a mixing column and having a first feed air line, which is connected to the distillation column system for nitrogen-oxygen separation, having a first liquid oxygen line, which is connected to the distillation column system for nitrogen-oxygen separation and leads into the mixing column via means for increasing the pressure of the liquid, having a heat transfer medium line, in particular a second feed air line, which leads into the lower region of the mixing column, having means for obtaining a gaseous top product in the upper region of the mixing column, and having a liquid line which leads out of the lower or middle region of the mixing column into the distillation column system for nitrogen-oxygen separation, a krypton-xenon enriching column for obtaining a krypton- and xenon-enriched fraction, a second liquid oxygen line for introducing a krypton- and xenon-containing oxygen stream from the distillation column system for nitrogen-oxygen separation into the krypton-xenon enriching column, means for introducing the gaseous top product of the mixing column into an additional column, and means for obtaining a krypton- and xenon-depleted top fraction in the upper region of the krypton-xenon enriching column.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

Figure 1:
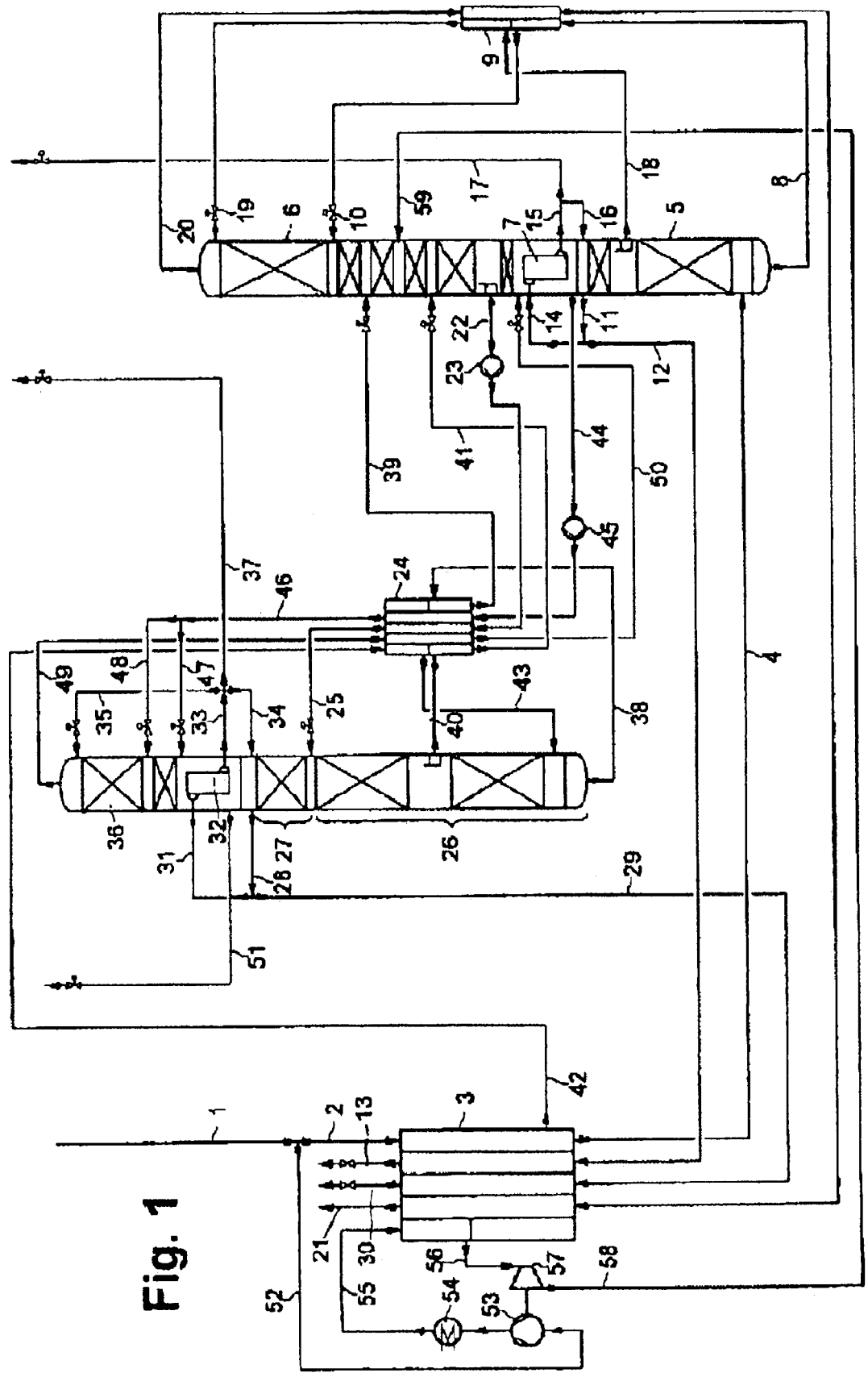
FIG. 1 shows a first exemplary embodiment of the invention with a combined column and a relatively low oxygen product pressure.

In the exemplary embodiment which is sketched in FIG. 1, purified air 1 is supplied at a pressure of, for example, 4.5 to 7.1 bar, preferably approximately 5.8 bar. A first part of this air flows via line 2 to a main heat exchanger 3, where it is cooled approximately to dew point and ultimately flows via line 4 into the high-pressure column 5 of a distillation column system for nitrogen-oxygen separation as "first feed air stream". The operating pressure of the high-pressure column 5 is, for example, 4.3 to 6.9 bar, preferably approximately 5.6 bar. The distillation column system for nitrogen-oxygen separation also has a low-pressure column 6 which is operated at, for example, 1.3 to 1.7 bar, preferably approximately 1.5 bar. These two columns are connected via a main condenser 7 in such a manner as to exchange heat.

The distillation column system for nitrogen-oxygen separation is designed in the exemplary embodiments as a conventional Linde double column apparatus. However, the invention can also be used in rectification systems with other condenser and/or column configurations.

Oxygen-enriched liquid 8 from the bottom of the high-pressure column 5 is cooled in a first supercooling countercurrent heat exchanger 9 and after throttling 10 is fed to the low-pressure column 6 at an intermediate location. A part 12 of the gaseous nitrogen 11 from the top of the high-pressure column 5 can be heated in the main heat exchanger 3 and obtained as pressurized nitrogen product 13. The remainder 14 is substantially completely condensed in the main condenser 7. At least part 16 of the liquid nitrogen 15 obtained is added as reflux to the high-pressure column 5. If necessary, another part 17 can be withdrawn as liquid product. An intermediate liquid 18 (impure nitrogen) from the high-pressure column 5, after supercooling 9 and throttling 19, is used as reflux for the low-pressure column 6. Gaseous impure nitrogen 20 from the top of the low-pressure column is heated in the heat exchangers 9 and 3 and ultimately withdrawn via line 21. It can be used as regenerating gas for a purifying device (not shown) for the air 1.

Liquid oxygen 22 is withdrawn from the low-pressure column 6 as "oxygen-rich fraction", is pressurized in a pump 23 to a pressure of, for example, 5.7 to 8.3 bar, preferably approximately 7.0 bar, is heated in a second supercooling countercurrent heat exchanger 24 and finally is added (25) to the top of the mixing column 26. The location at which the liquid oxygen 22 is removed is, in the example, approximately four theoretical plates above the bottom of the low-pressure column 6.

A heat transfer medium stream is passed into the mixing column in the opposite direction to the liquid oxygen-rich fraction 25, this heat transfer medium stream being formed in the exemplary embodiment by a second feed air stream 42, 43, which is branched off from the first feed air stream 4 at an intermediate temperature slightly above the cold end and is removed from the main heat exchanger 3, cooled further in the second supercooling countercurrent heat exchanger 24 and finally blown into the bottom region of the mixing column 26. The bottom liquid 38–39 and an intermediate liquid 40–41 from the mixing column 26 are in each case supercooled in the second supercooling countercurrent heat exchanger 24 and are throttled into the low-pressure column 6 at the locations which correspond to their composition.

The gaseous top product of the mixing column 26 flows to the lower end of an additional column 27, which in the present exemplary embodiment is combined with the mixing column 26. The combined column has three sections, the top one of which forms the additional column 27; the two lower sections constitute the mixing column 26. A first part 29 of the krypton- and xenon-depleted top fraction 28 is heated in the main heat exchanger 3 and obtained as gaseous pressurized oxygen product via line 30. The remainder 31 is substantially completely condensed in a condenser-evaporator 32. The condensate 33 formed then contains only a very small amount of krypton and xenon, and a first part 34 of this condensate is added to the additional column 27 as reflux, while a second part 35 of this condensate is added to a krypton-xenon enriching column 36 as reflux. If required, a third part 37 can be withdrawn as liquid oxygen product.

The krypton-xenon enriching column 36 is operated at a pressure which is approximately 1 bar below the top pressure of the additional column 27 and in the example is approximately 5.6 bar. As a result, the condenser-evaporator 32 can simultaneously be used as a bottom evaporator for the krypton-xenon enriching column. The krypton-xenon enriching column 36 (low-pressure part) and the combination of additional column 27 and mixing column 26 (high-pressure part) in this case form a double column. A krypton- and xenon-containing oxygen stream 44 is withdrawn in liquid form from the bottom of the low-pressure column 6, pressurized to an elevated pressure in a pump 45 and, after heating 24, is fed in at two different locations, via lines 46 and 47 or 48, as feed fraction for the krypton-xenon enriching column 36. Some methane leaves the krypton-xenon enriching column 36 together with the top gas 49–50 which is fed back to the low-pressure column. By contrast, krypton and xenon are scrubbed in the bottom, from which a krypton- and xenon-enriched fraction 51 is withdrawn in liquid form.

In the process, refrigeration is obtained by work-performing expansion 57 of a third feed air stream 52–55–56 to approximately the operating pressure of the low-pressure column. Upstream of its cooling in the main heat exchanger 3, the turbine air can be compressed further in a recompressor 53 with recooler 54 which is driven by the expansion turbine 57. The expanded third feed air stream 58 is finally blown into the low-pressure column 6 at 59.

In the process according to the invention, virtually all the krypton and xenon contained in the feed air 1 passes into the bottom of the krypton-xenon enriching column 36 and therefore into the concentrate 51 which is withdrawn therefrom. The lower-volatility fractions from the first feed air stream 4 are carried into the low-pressure column together with the bottom liquid 8 from the high-pressure column 5. Krypton and xenon which are present in the mixing column air (the second feed air stream) 42–43 are prevented from escaping with the pressurized oxygen product 28, 29, 30 by the additional column 27 and are passed into the low-pressure column 6 together with the liquids 38–39 and 40–41. The lower-volatility fractions of the turbine air (third feed air stream) 58–59 also ultimately end up in the bottom of the low-pressure column. Should the liquid oxygen 22 passed into the mixing column 26 also contain krypton and xenon, this too is retained in the additional column 27 and returned to the low-pressure column.

The removal of substantially all the krypton and xenon with the bottom liquid 44 of the low-pressure column 6 and the further concentration in the krypton-xenon enriching column 36 combined, at the same time, with methane being discharged results, according to the invention, in a very high yield of krypton and xenon.

Figure 2:
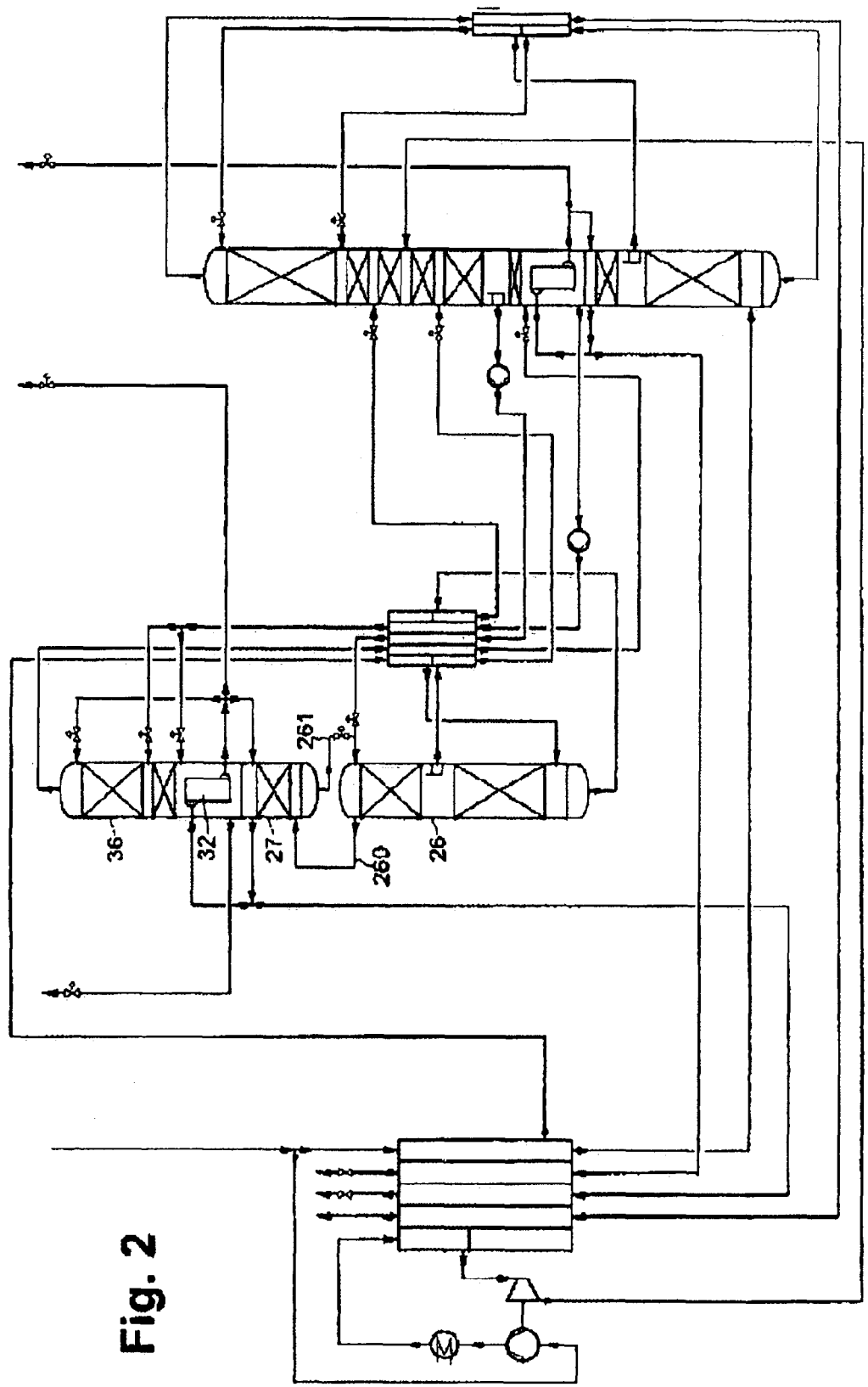
FIG. 2 shows a variant of FIG. 1 with separate krypton-xenon recovery.

FIG. 2 differs from FIG. 1 only in that the additional column 27 is accommodated in a vessel which is separate from the mixing column 26. The krypton-xenon enriching column 36 and the additional column 27 in this case together with the condenser-evaporator 32 form a double column.

In terms of process engineering, arranging the columns 26 and 27 separately is equivalent to the combined column shown in FIG. 1, since all the gaseous top product 260 of the mixing column 26 is passed into the bottom of the additional column 27, and, conversely all the bottom liquid 261 from the additional column 27 flows back to the top of the mixing column 26.

The variant shown in FIG. 2 is recommended in particular for existing mixing column installations which are to be retrofitted with a krypton-xenon recovery means.

Figure 3:
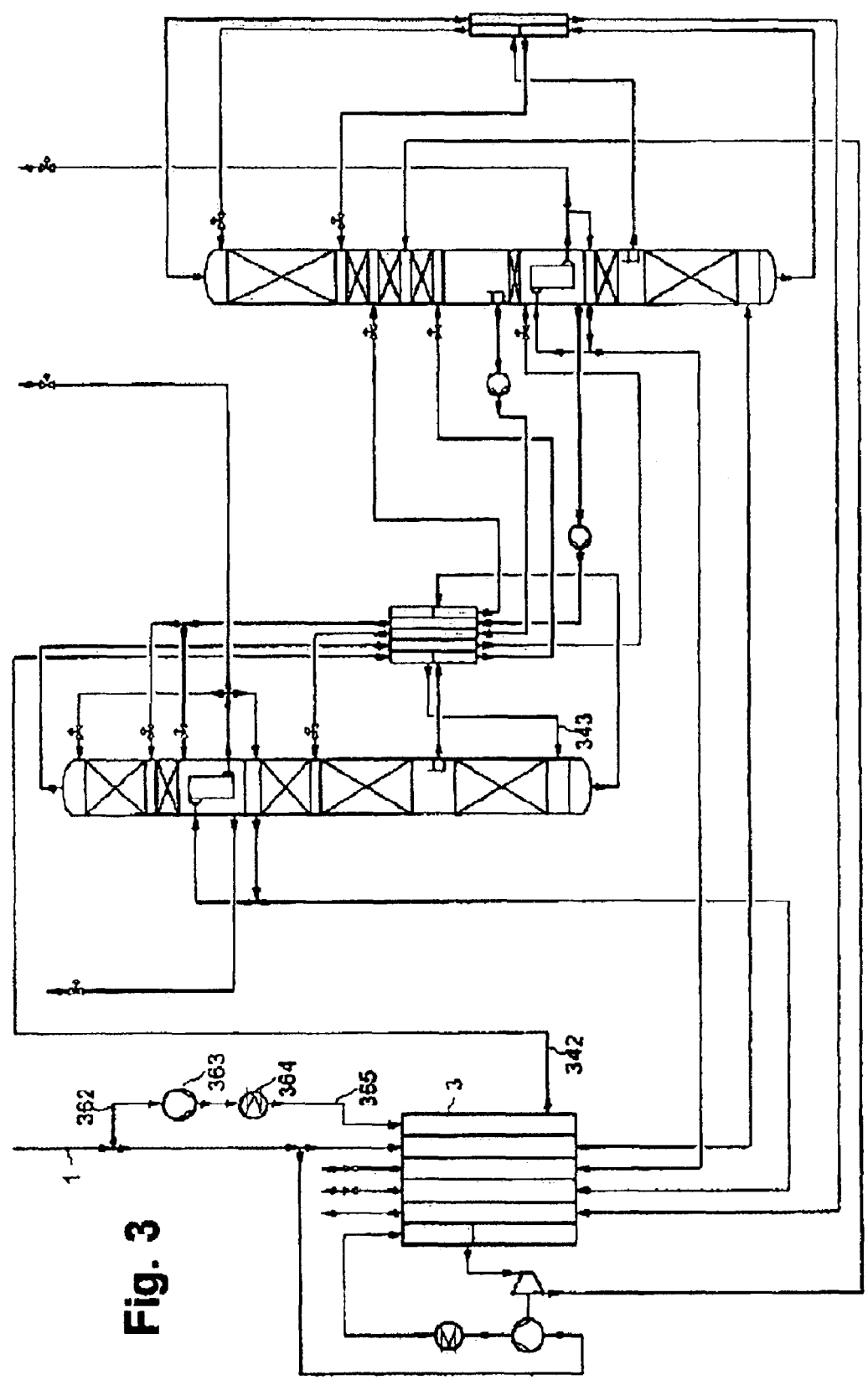
FIG. 3 shows a further exemplary embodiment with a higher oxygen product pressure.

While the processes illustrated in FIGS. 1 and 2 are suitable for oxygen product pressures which are less than or equal to the high-pressure column pressure, FIG. 3 shows a process which makes it possible to achieve higher product pressures. (Otherwise, FIG. 3 does not differ from FIG. 1.)

In this case, the second feed air stream 342–343 is branched off from the overall air 1 upstream of the main heat exchanger 3, via line 362. It is brought to a higher pressure by a recompressor 363 with recooler 364, so that the mixing column 26 is operated at a pressure of, for example, 7.0 to 17.0 bar, preferably approximately 12.0 bar.

The entire disclosure of all applications, patents and publications, cited above and below, and of corresponding German Application No. 102 28 111.4, filed Jun. 24, 2002 is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for low-temperature fractionation of air in a distillation column system for nitrogen-oxygen separation (5, 6), comprising:

introducing a first feed air stream (4) into the distillation column system for nitrogen-oxygen separation, pressurizing an oxygen-rich fraction (22) removed from the distillation column system for nitrogen-oxygen separation in liquid form (23) and introducing said oxygen-rich fraction (25) to a mixing column (26), introducing a heat transfer medium stream, in particular a second feed air stream (43, 343), into the lower region of the mixing column (26) and bringing said heat transfer medium stream into countercurrent contact with the oxygen-rich fraction (22, 25), removing a gaseous top product (260) from the upper region of the mixing column (26), introducing a liquid (38, 39, 40, 41) from the lower or middle region of the mixing column into the distillation column system for nitrogen-oxygen separation, introducing a krypton- and xenon-containing oxygen stream (44, 46, 47, 48) from the distillation column system for nitrogen-oxygen separation into a krypton-xenon enriching column (36), removing a krypton- and xenon-enriched fraction (51) from the krypton-xenon enriching column (36), introducing a gaseous top product (260) from the mixing column (26) into an additional column (27) and removing a krypton- and xenon-depleted top fraction (28) from the upper region of the additional column (27).

2. A process according to claim 1, wherein a part (29, 30) of the krypton- and xenon-depleted top fraction (28) from the additional column (27) is removed as gaseous pressurized oxygen product.

3. A process according to claim 2, wherein a part (31) of the krypton- and xenon-depleted top fraction (28) from the additional column (27) is condensed in a condenser-evaporator (32).

4. A process according to claim 2, wherein a part (34) of condensate (33) generated in a condenser-evaporator (32) is added as reflux to said additional column (27).

5. A process according to claim 4, wherein a part (35) of condensate (33) generated in said condenser-evaporator (32) is added as reflux to the krypton-xenon enriching column.

6. A process according to claim 2, wherein a part (35) of condensate (33) generated in a condenser-evaporator (32) is added as reflux to the krypton-xenon enriching column.

7. A process according to claim 2, wherein a liquid from the lower region of the krypton-xenon enriching column (36) is evaporated in a condenser-evaporator (32).

8. A process according to claim 1, wherein a part (31) of the krypton- and xenon-depleted top fraction (28) from the additional column (27) is condensed in a condenser-evaporator (32).

9. A process according to claim 8, wherein a part (34) of condensate (33) generated in said condenser-evaporator (32) is added as reflux to said additional column (27).

10. A process according to claim 9, wherein a part (35) of condensate (33) generated in said condenser-evaporator (32) is added as reflux to the krypton-xenon enriching column.

11. A process according to claim 8, wherein a liquid from the lower region of the krypton-xenon enriching column (36) is evaporated in a condenser-evaporator (32).

12. A process according to claim 1, wherein said oxygen-rich fraction (22) is removed one to five theoretical plates above the bottom of the distillation column system for nitrogen-oxygen separation or is removed one to five theoretical plates above the bottom of one of the columns of the distillation column system for nitrogen-oxygen separation.

13. A process according to claim 12, wherein the krypton- and xenon-containing oxygen stream (44) is removed from the bottom of the columns of the distillation column system for nitrogen-oxygen separation or is removed from the bottom of one of the columns of the distillation column system for nitrogen-oxygen separation.

14. A process according to claim 13, wherein the krypton- and xenon-containing oxygen stream (44) is removed from the bottom of a low-pressure column (6) of the distillation column system which contains a two-column system, and said two-column system comprises said low-pressure column (6) and a high-pressure column (5).

15. A process according to claim 1, wherein said oxygen-rich fraction (22) is removed one to five theoretical plates above the bottom of a low-pressure column (6) of the distillation column system which contains a two-column system, and said two-column system comprises said low-pressure column (6) and a high-pressure column (5).

16. A process according to claim 15, wherein the krypton- and xenon-containing oxygen stream (44) is removed from the bottom of the columns of the distillation column system for nitrogen-oxygen separation or is removed from the bottom of one of the columns of the distillation column system for nitrogen-oxygen separation.

17. A process according to claim 16, wherein the krypton- and xenon-containing oxygen stream (44) is removed from the bottom of a low-pressure column (6) of the distillation column system which contains a two-column system, and said two-column system comprises said low-pressure column (6) and a high-pressure column (5).

18. A process according to claim 1, wherein the krypton- and xenon-containing oxygen stream (44) is removed from the bottom of the columns of the distillation column system for nitrogen-oxygen separation or is removed from the bottom of one of the columns of the distillation column system for nitrogen-oxygen separation.

19. A process according to claim 18, wherein the krypton- and xenon-containing oxygen stream (44) is removed from the bottom of a low-pressure column (6) of the distillation column system which contains a two-column system, and said two-column system comprises said low-pressure column (6) and a high-pressure column (5).

20. An apparatus for the low-temperature fractionation of air, comprising:
   a distillation column system for nitrogen-oxygen separation (5, 6), having a mixing column (26);
   a first feed air line (4) connected to the distillation column system for nitrogen-oxygen separation;
   a first liquid oxygen line (22, 25) connected to the distillation column system for nitrogen-oxygen separation and leading into the mixing column (26) via means (23) for increasing the pressure of the liquid;
   a heat transfer medium line connected to the lower region of the mixing column (26);
   means for removing a gaseous top product (260) from the upper region of the mixing column (26),
   a liquid line (38, 39, 40, 41) connected to the lower or middle region of the mixing column;
   a krypton-xenon enriching column (36) for obtaining a krypton- and xenon-enriched fraction (51),
   a second liquid oxygen line (44, 46, 47, 48) for introducing a krypton- and xenon-containing oxygen stream from the distillation column system for nitrogen-oxygen separation into the krypton-xenon enriching column (36),
   means (260) for introducing the gaseous top product from the mixing column (26) into an additional column (27); and
   means for removing a krypton- and xenon-depleted top fraction (28) from the upper region of the krypton-xenon enriching column (36).

21. An apparatus according to claim 20, wherein said heat transfer medium line is a second feed air line (43, 343) connected to the lower region of the mixing column (26).

* * * * *